United States Patent
Fourney

(10) Patent No.: US 8,701,871 B2
(45) Date of Patent: Apr. 22, 2014

(54) BELT CONVEYOR WITH SNAGLESS RETRACTABLE FLIGHTS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 469 days.

(21) Appl. No.: 13/072,469

(22) Filed: Mar. 25, 2011

(65) Prior Publication Data

US 2012/0241292 A1 Sep. 27, 2012

(51) Int. Cl.
*B65G 17/24* (2006.01)
*B65G 47/28* (2006.01)

(52) U.S. Cl.
USPC .............................. 198/779; 198/698; 198/697

(58) Field of Classification Search
None
See application file for complete search history.

(56) References Cited

U.S. PATENT DOCUMENTS

| | | | |
|---|---|---|---|
| 3,589,497 A | 6/1971 | Leach | |
| 5,038,921 A | 8/1991 | Hoppmann et al. | |
| 6,318,544 B1 | 11/2001 | O'Connor et al. | |
| 6,390,285 B2 | 5/2002 | deGeus et al. | |
| 7,311,192 B2 | 12/2007 | Fourney | |
| 7,537,105 B2 | 5/2009 | Fourney | |
| 7,770,718 B2 | 8/2010 | Fourney | |
| 7,775,345 B2 | 8/2010 | Fourney | |
| 2006/0113166 A1 | 6/2006 | Wolkerstoffer | |
| 2009/0242358 A1* | 10/2009 | Fourney | 198/728 |

FOREIGN PATENT DOCUMENTS

| | | |
|---|---|---|
| DE | 2308505 A1 | 8/1974 |
| DE | 4028635 C1 | 12/1991 |
| FR | 2175266 A5 | 10/1973 |
| NL | 6602114 A | 9/1966 |
| WO | 2009158504 A1 | 12/2009 |

OTHER PUBLICATIONS

International Search Report and Written Opinion of the International Searching Authority, PCT/US12/29628, mailed Jun. 15, 2012, European Patent Office, Rijswijk, NL.

* cited by examiner

*Primary Examiner* — Kavel Singh
(74) *Attorney, Agent, or Firm* — James T. Cronvich

(57) ABSTRACT

A belt conveyor having snagless retractable flights. The flights rotate from a retracted position generally parallel to a top conveying surface on the conveyor belt to an extended position standing up and away from the top surface. In one version of the flight, a distal edge of the flight is bent downward into a cavity in the top surface of the belt when the flight is retracted. In another version, rollers at the distal end of the flight extend upstream of the distal edge of the flight. The flight rollers are rotated when the flight is retraced to lift and propel conveyed articles over the edges of the flight. Thus, both flights avoid snagging articles with discontinuous bottoms.

19 Claims, 4 Drawing Sheets

BELT CONVEYOR WITH SNAGLESS RETRACTABLE FLIGHTS

BACKGROUND

The invention relates generally to power-driven conveyors and more particularly to belt conveyors having retractable flight members.

Many conveying applications require that conveyed articles be spaced apart on a conveyor belt. For example, merging two or more flows of articles into a single file without collisions is a common requirement. One conveyor used to accomplish this without slowing the belt or using complex sensors and external spacing bars is described in U.S. Pat. No. 7,770,718, "Systems and Methods for Providing an Improved Timing Conveyor," Aug. 10, 2010, by the applicant of this application. The disclosure of that application is incorporated into this application by reference. The conveyor includes a conveyor belt, belt rollers, and flights. Lower surfaces on the rollers engage a roller-engagement surface below the belt. Upper surfaces of the rollers define a plane above the belt. As the belt advances, the rollers roll on the roller-engagement surface and rotate to move an article supported on the rollers forward along the plane. The flights, which are spaced apart along the length of the belt, include cams that engage a cam surface below the belt to impart a moment on the flight and projections that respond to the moment by rotating from a retracted position to an extended position blocking the further advance of an article propelled forward. The cam-actuated flights, in conjunction with the article-accelerating rollers, cause conveyed articles to be staged at known locations on the belt for proper merging. The flights assume a retracted position as they return from the returnway before they encounter the cam surface. A conveyed article resting atop a retracted flight before it is raised to the extended position prevents the flight from popping up by cam action until the article is pushed clear of the flight by the rollers.

Another version of a retractable flight with a clutch mechanism that exerts a low torque on the flight to rotate it up to the extended position is described in U.S. Pat. No. 7,775,345, "Conveyor and Belt with Clutch-Driven Flights," Aug. 17, 2010, also to the applicant of this application. The disclosure of that application is incorporated into this application by reference. When a conveyed article—even a lightweight envelope—is atop a retracted flight, the low torque provided by the clutch is insufficient to raise the flight from its retracted position. This prevents lightweight articles from leaning from the top of an extended flight without enough frictional contact with the belt rollers to clear the article from the flight, which disrupts the regular positioning of articles on the belt.

In some instances, the bottoms of articles, such as boxes, have loose flaps, flaps glued out of position, or other steps, or discontinuities, which can catch on the edge of the flights in their extracted position. When an article catches on a flight, the conveyor can jam or the article can rotate out of its preferred orientation.

SUMMARY

These shortcomings are addressed by a conveyor belt embodying features of the invention. One version of such a conveyor belt comprises a top surface and a bottom surface arranged to advance in a direction of belt travel. A pivot rod in the belt extends axially perpendicular to the direction of belt travel and parallel to the top and bottom surfaces. A flight has a pivot at the end that is coupled to the pivot rod. A projection extends outward from the pivot to a distal end. The flight can rotate about the pivot rod between a retracted position, in which the projection lies along the top surface, and an extended position, in which the projection stands up away from the top surface. Snag-prevention means disposed at the distal end of the flight prevent the distal end of the projection from catching on discontinuities in the bottoms of conveyed articles while the flight is retracted.

One version of a conveyor embodying features of the invention comprises a conveyor belt as described in the preceding paragraph advancing along a carryway and an actuation mechanism disposed on the carryway below the conveyor belt. The actuation mechanism is coupled to the pivot to rotate the flight from the retracted position to the extended position.

BRIEF DESCRIPTION OF THE DRAWINGS

The features of the inventions and its advantages are described in more detail in the following description, appended claims, and accompanying drawings, in which:

DETAILED DESCRIPTION

Figure 1:
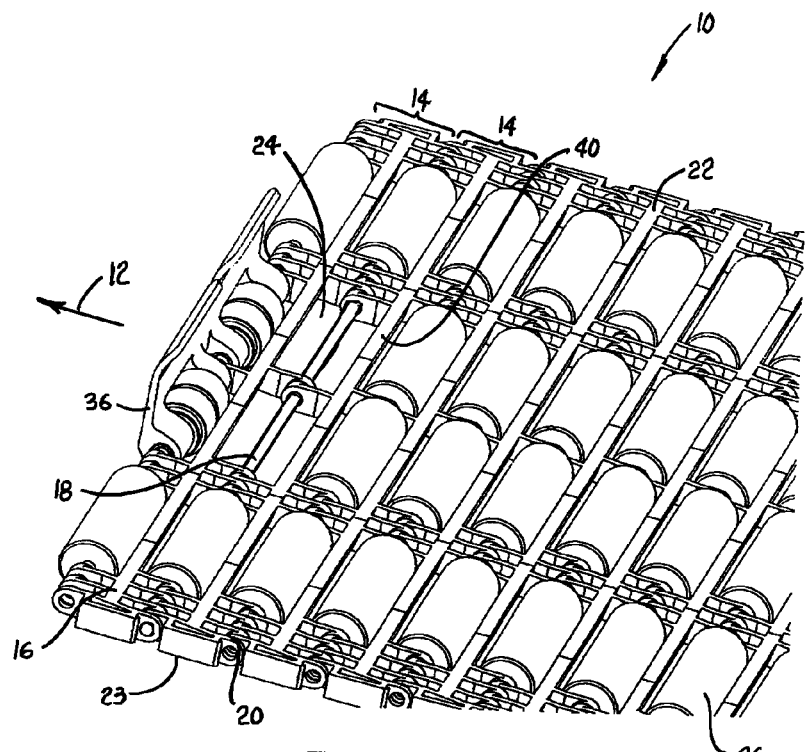
FIG. 1 is an axonometric view of a portion of one version of a conveyor belt embodying features of the invention, showing a retractable bent flight in an extended position.

A portion of a conveyor belt embodying features of the invention is shown in FIGS. 1-4. The conveyor belt 10 is driven in a direction of belt travel 12 along a carryway 13. The conveyor belt may be a flat belt, but is preferably a modular plastic conveyor belt constructed of a series of rows 14 of one or more side-by-side injection-molded thermoplastic modules 16 linked together by hinge rods 18 through interleaved hinge elements 20 along leading and trailing ends of each row. The belt extends in thickness from a top outer surface 22 to an opposite bottom inner surface 23.

Some of the hinge elements along one end of some of the belt modules are missing to provide cavities 24 for article-accelerating rollers 26 or clutch wheels 28. A support plate 30 supports the conveyor belt on the carryway 13 and provides an engagement surface 32 on which the article-accelerating rollers can roll as the conveyor belt advances. Articles 34 supported atop the rollers 26 are accelerated forward along the belt by rotation of the rollers until the articles contact a flight 36 in an extended position blocking their further advance, as in FIGS. 1 and 3. The positions of the flights on the belt define relative registered positions along the length of the belt that can be used to set precise spacings between consecutive conveyed articles, such as for a pre-merge conveyor used to prevent collisions between merging articles.

Figure 2:
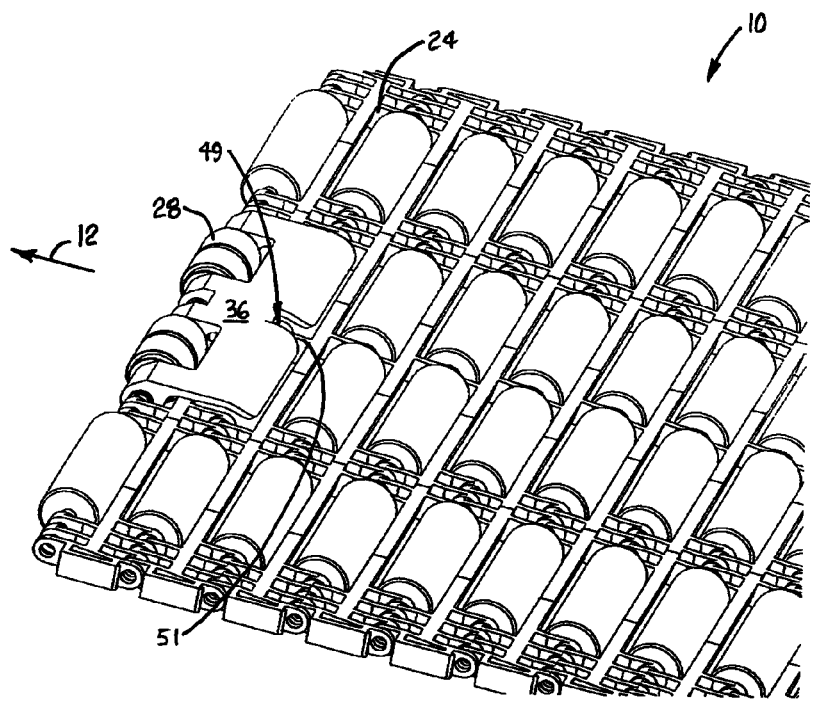
FIG. 2 is an axonometric view of the conveyor belt of FIG. 1 with the flight in a retracted position.
Figure 3:
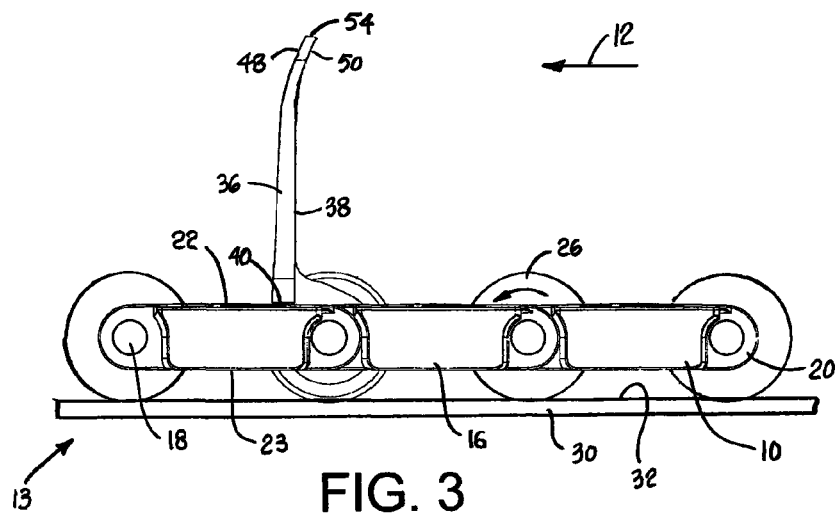
FIG. 3 is an enlarged side elevation view of a portion of the conveyor belt of FIG. 1 with a flight extended.
Figure 4:
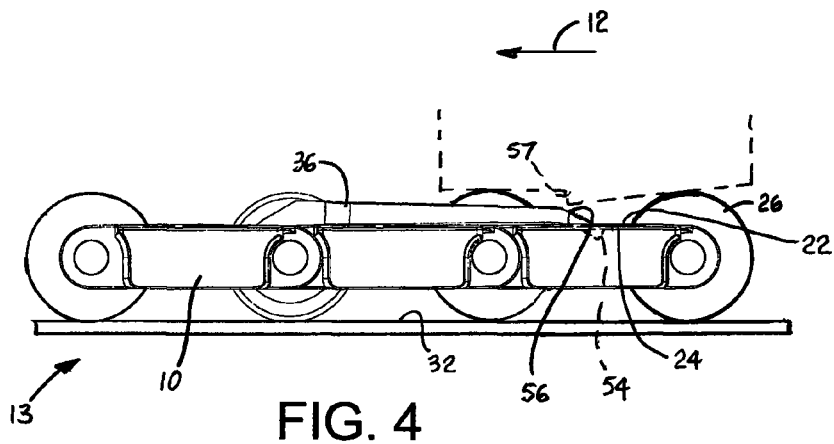
FIG. 4 is an enlarged side elevation view as in FIG. 3 with the flight retracted.

The flight 36 rotates from a retracted position as shown in FIGS. 2 and 4, to an extended position (FIGS. 1 and 3). In the retracted position, the flight rests along the top surface 22 of the belt, generally parallel to the direction of belt travel 12. In this non-blocking position, articles are propelled forward by rotation of the belt rollers 26 rolling on the engagement surface 32. In the extended position, the flight stands up away from the top surface of the belt in an article-blocking position with a rear face 38 of the flight serving as a registration surface. Intermediate structure 40 in the belt module forms a stop past which the flight cannot rotate. In this example, the flight can rotate over a limited angular range of about 90° between the retracted and extended positions. But, in other applications, the intermediate structure and the flight could be structured to allow the flight to rotate through a range of less than 90° or a range up to as much as 180°.

Figure 5:
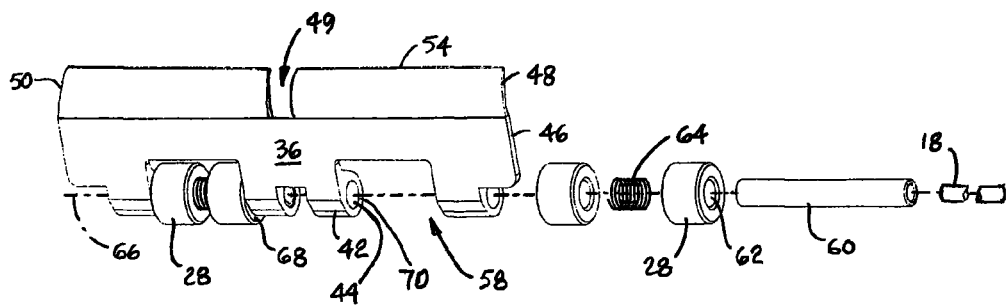
FIG. 5 is an exploded view of the flight of FIG. 1 with a clutch mechanism to pivot the flight.

Details of the flight are shown in more detail in FIGS. 3-5. The flight 36 comprises four pivots 42 having aligned bores 44. A projection 46 extends outward from each pivot to a distal end 48. The projection is shown as a thin, generally rectangular structure whose rear face 38 defines a registration position on the belt. A lip 50 at the distal end of the flight bends downward into a cavity 24 opening onto the top surface 22 of the conveyor belt. A slit 49 in the lip provides clearance for belt structure 51 in the cavity 24. In this way, the bent lip 50 serves as snag-prevention means by recessing the catch point at the distal edge 54 of the flight below the top surface 22 of the belt and out of contact with conveyed articles. The convex leading surface 56 of the retracted flight allows accelerated articles to slide freely over it without snagging on discontinuities on the bottom 57.

The flight 36 is preferably made of a lightweight material such as plastic. The pivots 42 are grouped in two pairs on opposite lateral halves of the flight. A gap 58 is formed between the pivots of each pair. A bushing, or sleeve 60, preferably made of stainless steel, is inserted into the bore of the outside pivot, through a bore 62 in one of the clutch wheels 28, through the center of a coil spring 64, through the bore of another wheel, and into the bore of the inside pivot 42. The outer diameter of the sleeve is slightly greater than the nominal inside diameter of the bores in the pivots to ensure that the sleeve is retained firmly at each end in the pivots in a press fit. The inside diameter of the bores in the wheels is slightly greater than the outside diameter of the sleeve so that they can rotate on the sleeve. The coil spring biases the wheels against corresponding pivots. A pivot rod, in this example, one of the belt's hinge rods 18, is received in the sleeve and defines an axis of rotation 66 transverse, such as perpendicular, to the direction of belt travel 12 and parallel to the top and bottom surfaces 22, 23 of the belt. The pivots, the wheels, and the coil spring are all coaxially aligned along that axis.

The spring-loaded wheels engage the pivots in a clutch arrangement. The wheels have flat driving faces 68 on the sides of the wheels opposite the spring. The driving faces are pushed against driven faces 70 on corresponding confronting sides of the pivots. As the belt advances on the carryway, the wheels 28 ride on the engagement surface 32, which acts as an actuation mechanism for the flights 36 and the article-accelerating rollers 26. The rotation of the wheels rubbing against the pivots imparts a moment about the axis of rotation on the pivots that rotates a flight unencumbered by a conveyed article or the stop 40 to the extended position. When the flight is weighted down by a conveyed article or reaches the stop and is hindered from rotating, the driving faces of the clutch wheels slip on the driven faces of the pivots. The total friction between the wheels and the pivots can be increased or decreased by adjusting the tension in the spring, changing the contact area between the driving and the driven faces, or changing the materials out of which the wheels and the flight are made to adjust the coefficient of friction.

In one mode of operation, as the belt returns to the carryway around an idle sprocket (not shown), the flights are gravitationally returned to their retraced state while running upside-down along the returnway. Until the clutch wheels 28 reach the engagement surface 32, the flights remain retracted. If an article—even a lightweight article—is atop a flight above the engagement surface, the flight does not pop up because the low torque produced by the clutch mechanism is insufficient to overcome the load and rotate the flight. The amount of torque may be set to a predetermined level to meet other operating requirements. The wheels slip on the pivots of the flight until the article is propelled forward past the flight by contact with the rotating rollers 26 and the clutch wheels 28. The diameters of the clutch wheels and of the rollers are preferably equal so that their salient portions protruding above and below the belt define common planes—an articles-supporting plan on top and a plane containing the engagement surface 32 along the carryway—parallel to the conveying surface of the belt. And, because the diameter of the clutch wheels exceeds the diameter of the pivots, the wheels extend above the level of the retracted flight into position to accelerate conveyed articles. Thus, both the rollers and the clutch wheels can be actuated by contact with the same engagement surface to propel conveyed articles forward.

Figure 6:
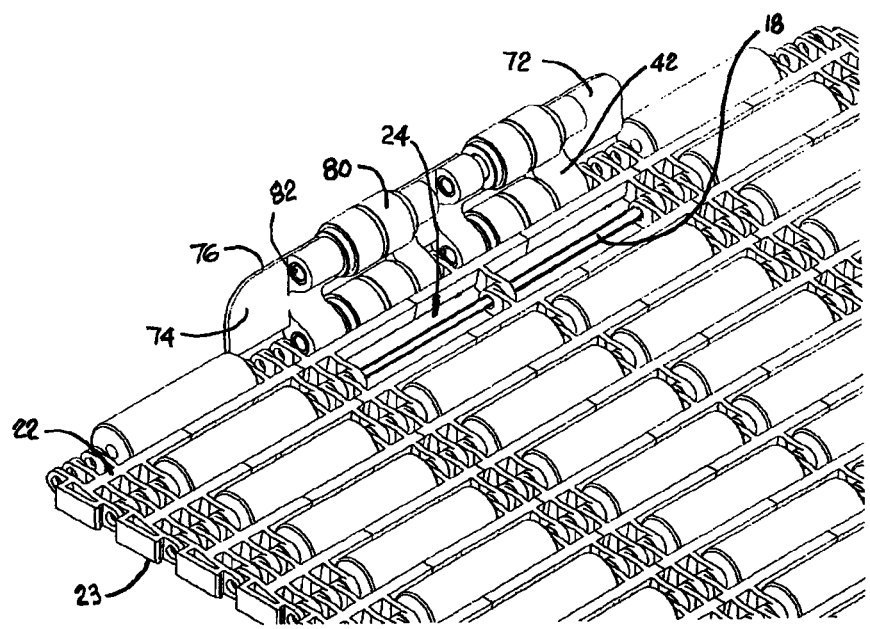
FIG. 6 is an axonometric view of a portion of a conveyor belt as in FIG. 1, but with a different version of a snagless flight shown in an extended position.
Figure 7:
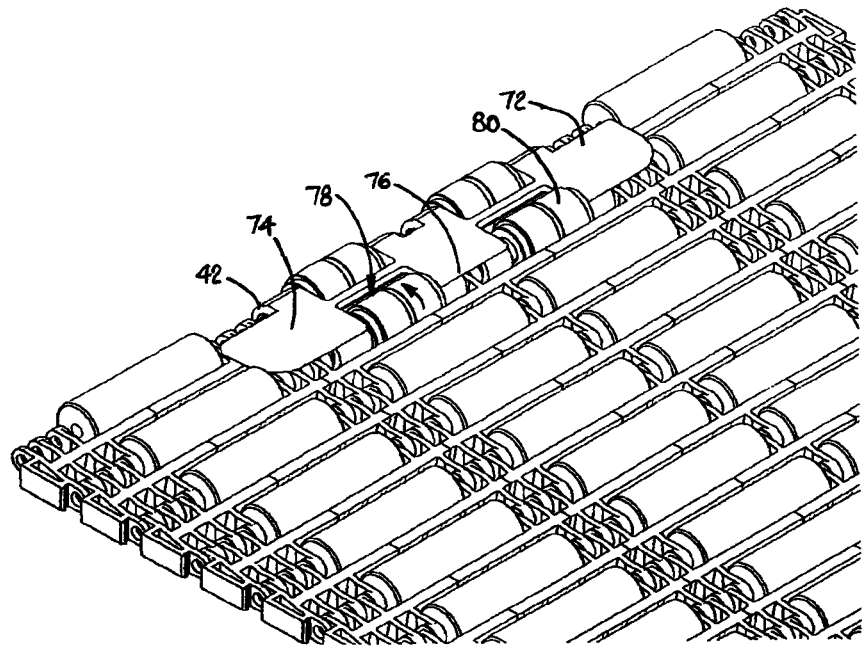
FIG. 7 is an axonometric view as in FIG. 6, but with the flight retracted.

Another version of a snagless flight is shown in FIGS. 6 and 7 in a conveyor belt that can be otherwise identical to that of FIG. 1. In this version, the flight 72 has a planar projection 74 extending outward from the pivots 42 to a distal end 76. A recess 78 in the distal end receives flight rollers 80 mounted for rotation on axles 82 parallel to the axes of the pivot rods 18. In a retracted position as in FIG. 7, the flight rollers 80, which are upstream of the distal edge 76, extend through the cavities 24 opening onto the top and bottom surfaces 22, 23 of the belt and into rolling contract with the actuating mechanism below the belt. So, the flight rollers 80, rotating just like the article-accelerating rollers 26, lift and propel accelerated articles up and over the distal edges of the flight to avoid snags. The flight rollers 80 at the distal end of the flight 72 are another example of snag-prevention means usable in a conveyor belt.

Figure 8:
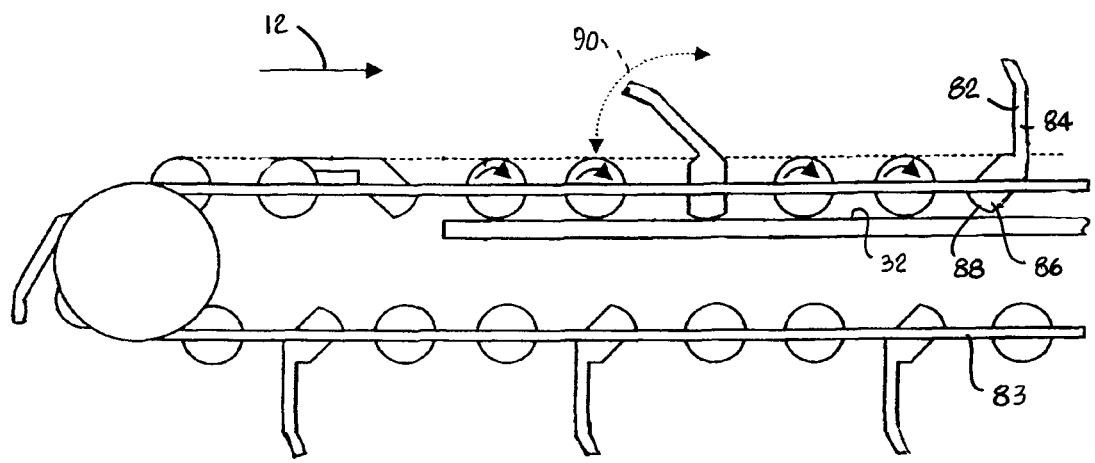
FIG. 8 is a side elevation view of one version of a conveyor using a conveyor belt as in FIG. 1 or FIG. 6.

Another version of a pivot for a snagless retractable flight is shown in FIG. 8. In this version, each flight 82 in a conveyor belt 83 has a projection 84 extending outward from a pivot 86. The pivot has a rounded cam face 88 that serves as a cam follower. The engagement surface 32 of the actuation mechanism acts as a cam surface. As the cam follower rides along the cam surface in the direction of belt travel 12, it rotates the flight 82 at the pivot 86 from the retracted position to the extended position as indicated by arrow 90.

Although the invention has been described in detail with respect to a few exemplary versions, other versions are possible. For example, the snagless retractable flights could be used with a belt without article-accelerating rollers. As another example, the cam pivots could be used as alternatives to the clutch-driven pivots. So, as these few examples suggest, the scope of the claims is not meant to be limited to the exemplary versions.

What is claimed is:

1. A conveyor belt comprising:
   a top surface and an opposite bottom surface arranged to advance along a carryway in a direction of belt travel;
   a pivot rod extending axially perpendicular to the direction of belt travel and parallel to the top and bottom surfaces;
   a flight having a pivot at one end coupled to the pivot rod and a projection extending outward from the pivot to a distal end, wherein the flight is rotatable about the pivot rod between a retracted position, in which the projection lies along the top surface, and an extended position, in which the projection stands up away from the top surface; and snag-prevention means disposed at the distal end of the flight to prevent the distal end of the projection from catching on discontinuities in the bottoms of conveyed articles while the flight is in the retracted position.

2. A conveyor belt as in claim 1 further comprising a cavity opening onto the top surface, wherein the snag-prevention means comprises a lip at the distal end of the projection bent downward into the cavity while the flight is in the retracted position to prevent the distal end of the flight from catching on discontinuities in the bottoms of conveyed articles.

3. A conveyor belt as in claim 1 wherein the snag-prevention means comprises a roller rotatably disposed at the distal end of the projection with a salient portion of the roller outward of the distal end of the projection to prevent the distal end of the projection from catching on discontinuities in the bottoms of conveyed articles while the flight is in the retracted position.

4. A conveyor belt as in claim 3 wherein the projection has a recess extending inward from the distal end for rotatably receiving the roller.

5. A conveyor belt as in claim 3 further comprising a cavity opening onto the top surface for receiving the roller while the flight is in the retracted position.

6. A conveyor belt as in claim 5 wherein the cavity opens onto the bottom surface and a salient portion of the roller protrudes from the cavity past the bottom surface while the flight is in the retracted position.

7. A conveyor belt as in claim 1 further comprising a plurality of belt rollers extending beyond the top and bottom surfaces and rotatable on axes parallel to the pivot rod.

8. A conveyor comprising:
a carryway;
a conveyor belt including:
a top surface and an opposite bottom surface arranged to advance along the carryway in a direction of belt travel;
a pivot rod extending axially perpendicular to the direction of belt travel and parallel to the top and bottom surfaces;
a flight having a pivot at one end coupled to the pivot rod and a projection extending outward from the pivot to a distal end, wherein the flight is rotatable about the pivot rod between a retracted position, in which the projection lies along the top surface, and an extended position, in which the projection stands up away from the top surface; and
snag-prevention means disposed at the distal end of the flight to prevent the distal end of the projection from catching on discontinuities in the bottoms of conveyed articles while the flight is in the retracted position;
an actuation mechanism disposed on the carryway below the conveyor belt and coupled to the pivot to rotate the flight from the retracted position to the extended position.

9. A conveyor as in claim 8 wherein the actuation mechanism includes a cam surface and wherein the pivot comprises a cam follower that engages the cam surface to rotate the flight to the extended position.

10. A conveyor as in claim 8 wherein the actuation mechanism includes a cam surface and wherein the conveyor belt includes a clutch received on the pivot rod and biased against the pivot, the clutch having an outer surface that rolls on the cam surface to rotate the clutch about the pivot rod and the flight to the extended position.

11. A conveyor as in claim 8 wherein the conveyor belt further comprises a cavity opening onto the top surface, wherein the snag-prevention means comprises a lip at the distal end of the projection bent downward into the cavity while the flight is in the retracted position to prevent the distal end of the flight from catching on discontinuities in the bottoms of conveyed articles.

12. A conveyor as in claim 8 wherein the snag-prevention means comprises a roller rotatably disposed at the distal end of the projection with a salient portion of the roller outward of the distal end of the projection to prevent the distal end of the projection from catching on discontinuities in the bottoms of conveyed articles while the flight is in the retracted position.

13. A conveyor as in claim 12 wherein the projection has a recess extending inward from the distal end for rotatably receiving the roller.

14. A conveyor as in claim 12 further comprising a cavity opening onto the top surface for receiving the roller while the flight is in the retracted position.

15. A conveyor as in claim 14 wherein the cavity opens onto the bottom surface and a salient portion of the roller protrudes from the cavity past the bottom surface and into rolling engagement with the actuation mechanism while the flight is in the retracted position.

16. A conveyor as in claim 8 further comprising a plurality of belt rollers extending beyond the top and bottom surfaces and rotatable on axes parallel to the pivot rod by engagement with the actuation mechanism.

17. A conveyor comprising:
a carryway;
a conveyor belt including:
a top surface and an opposite bottom surface arranged to advance along the carryway in a direction of belt travel;
a pivot rod extending axially perpendicular to the direction of belt travel and parallel to the top and bottom surfaces;
a flight having a pivot at one end coupled to the pivot rod and a projection extending outward from the pivot to a lip at a distal end of the pivot, wherein the flight is rotatable about the pivot rod between an extended position, in which the projection stands up away from the top surface, and a retracted position, in which the projection lies along the top surface and the lip is bent downward to prevent the distal end of the projection from catching on discontinuities in the bottoms of conveyed articles;
an engagement surface disposed on the carryway below the conveyor belt and engaging the pivot to rotate the flight from the retracted position to the extended position.

18. A conveyor as in claim 17 wherein the pivot comprises a cam follower that engages the engagement surface to rotate the flight to the extended position.

19. A conveyor as in claim 17 wherein the conveyor belt further comprises a cavity opening onto the top surface receiving the downwardly bent lip at the distal end of the projection while the flight is in the retracted position.

* * * * *